Figure 1:
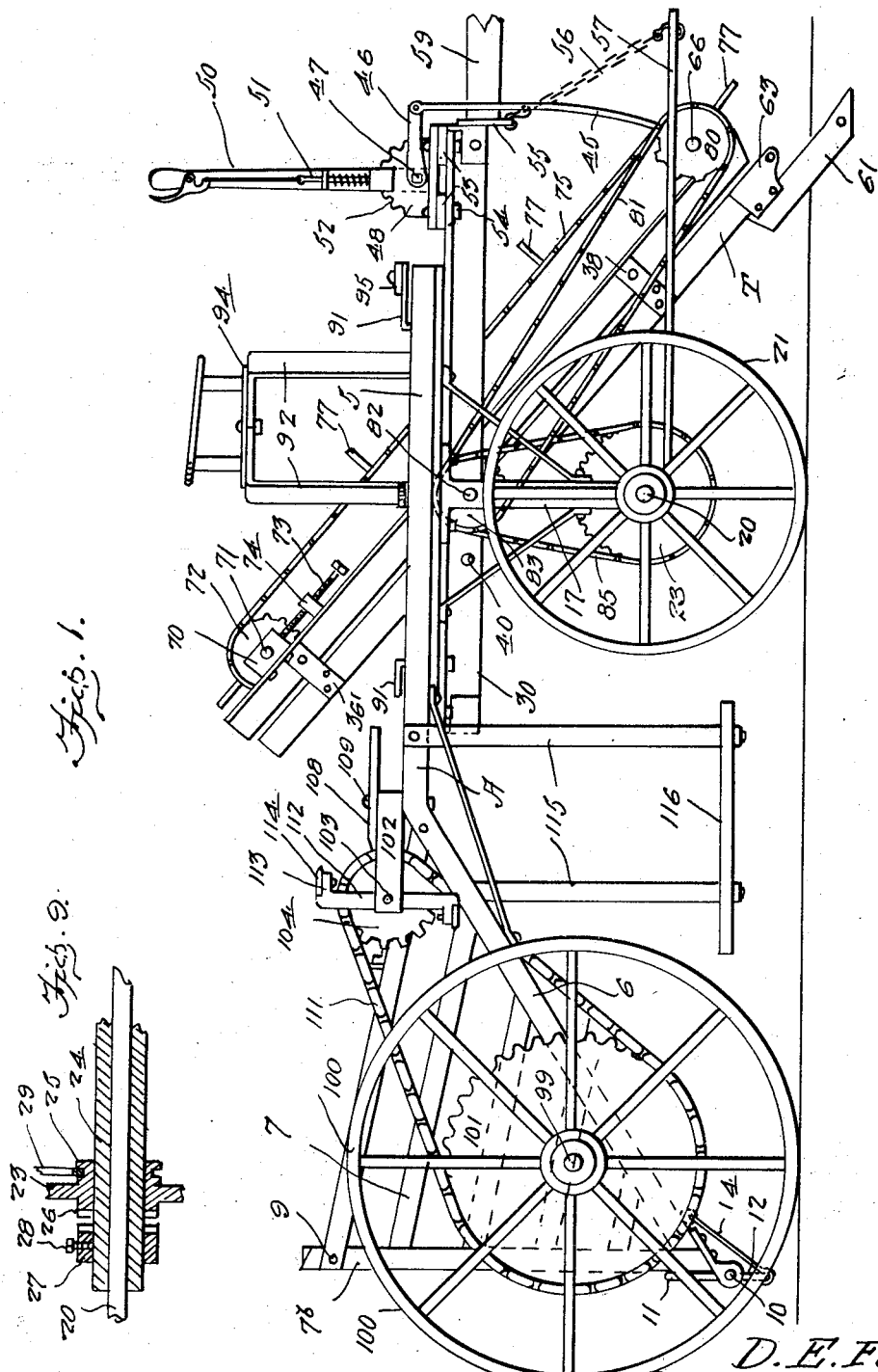

Oct. 21, 1930.    D. E. FELTMAN    1,779,308
BEET HARVESTING MACHINE
Filed Oct. 20, 1928    5 Sheets-Sheet 1

Inventor
D. E. Feltman
By Clarence A. O'Brien
Attorney

Oct. 21, 1930.  D. E. FELTMAN  1,779,308
BEET HARVESTING MACHINE
Filed Oct. 20, 1928  5 Sheets-Sheet 3

Inventor
D. E. Feltman
By Clarence A. O'Brien
Attorney

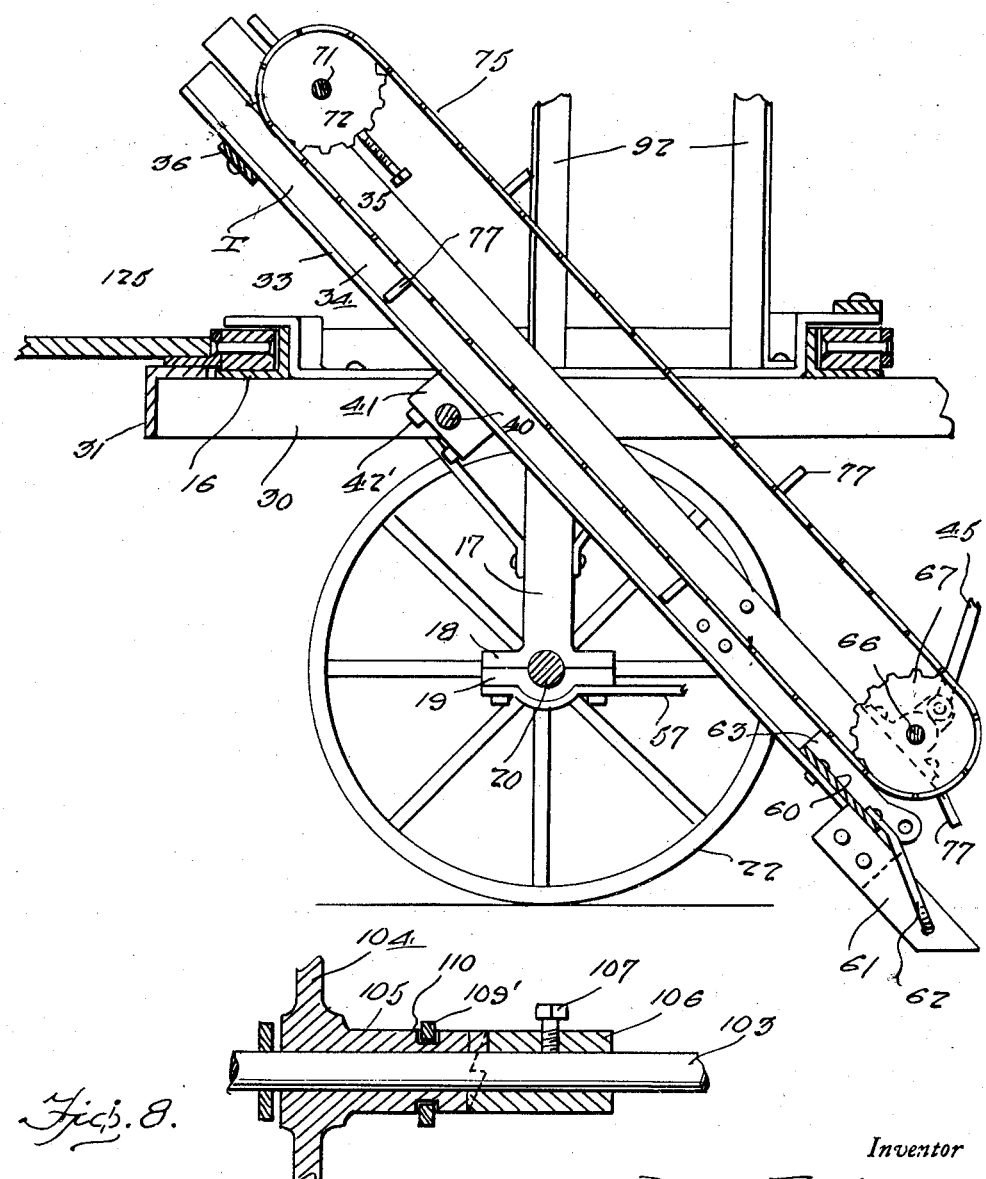

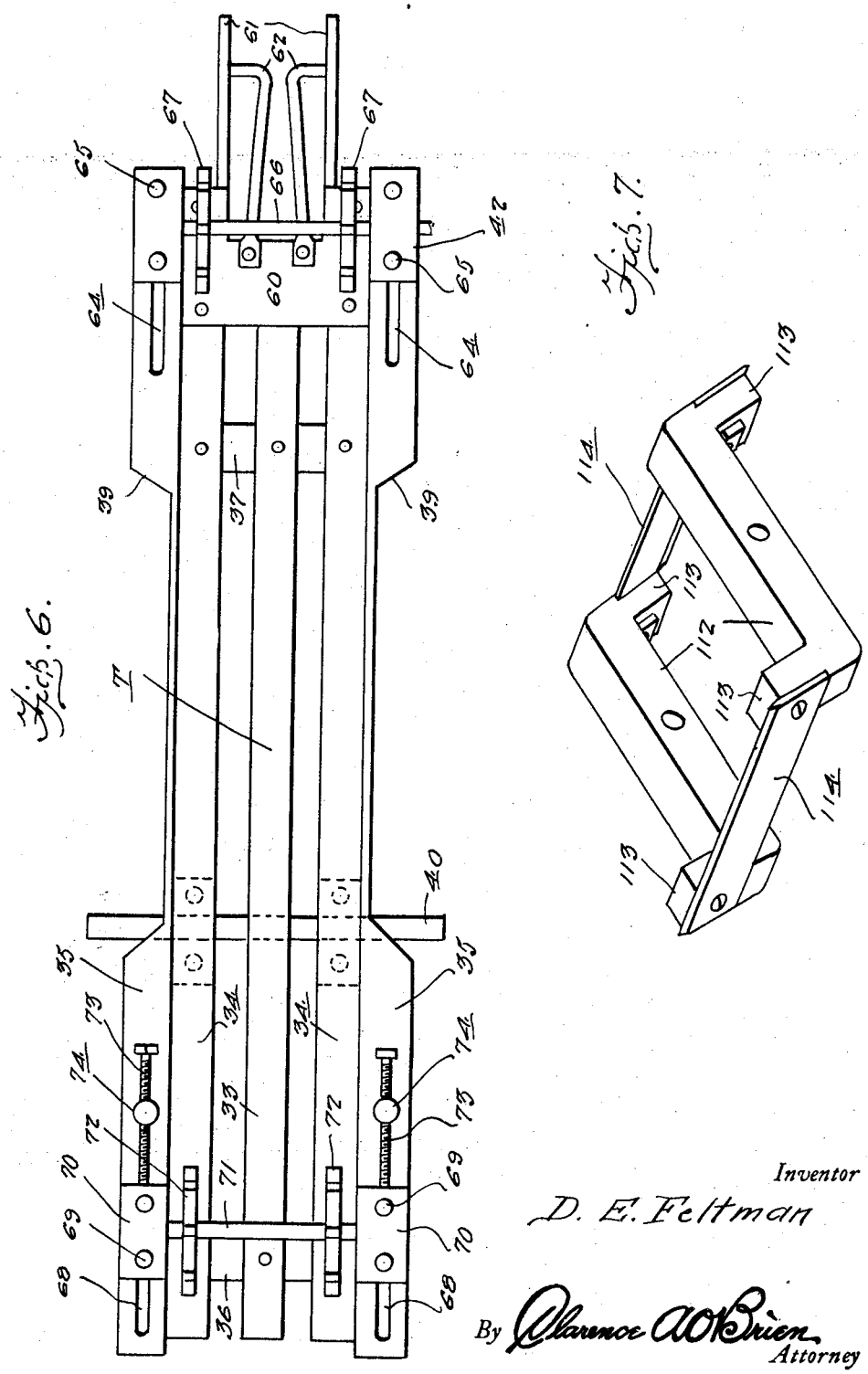

Patented Oct. 21, 1930

1,779,308

UNITED STATES PATENT OFFICE

DAVID E. FELTMAN, OF OTTAWA, OHIO

BEET-HARVESTING MACHINE

Application filed October 20, 1928. Serial No. 313,831.

The present invention relates to harvesting machines generally and more particularly to a machine of this nature especially designed for harvesting sugar beets, potatoes and the like.

The general object of the invention resides in the provision of a mobile machine of this nature which may be caused to travel along the ground and which will dig from the ground the beets, potatoes or the like and elevate them to a position whereby the beets, for example, may be taken by men standing on side platforms and the beets topped by rotary knives and thrown into a receptacle on the rear of the machine.

Another very important object of the invention resides in the provision of a frame structure for a harvesting machine of this nature which includes a front truck turnable all around on a vertical axis so that the machine may be turned around in practically its own length.

Another very important object of the invention resides in the provision of a tiltable trough on the front truck with an endless conveyor therein and beet digging means at the lower end thereof and further in the provision of means for tilting the trough and holding it in different tilted positions, whereby the digging depth of the digging means may be controlled and when desired it may be lifted clear of the ground.

Another very important object of the invention resides in the provision of a bracket across the rear portion of the machine supporting a rotatable shaft operatively connected with one of the rear wheels and beet toppers on the ends of the shaft and the location of platforms to the sides of the frame so that men may stand on these platforms and place beets in proper position in relation to the beet toppers for severing the tops therefrom in a convenient manner.

A still further very important object of the invention resides in the provision of a harvesting machine of this nature which has its parts arranged in an exceedingly compact and convenient manner to afford ease of manipulation and maneuver of the machine in the field and further in the provision of a mechanism which is thoroughly efficient and reliable in use and operation and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
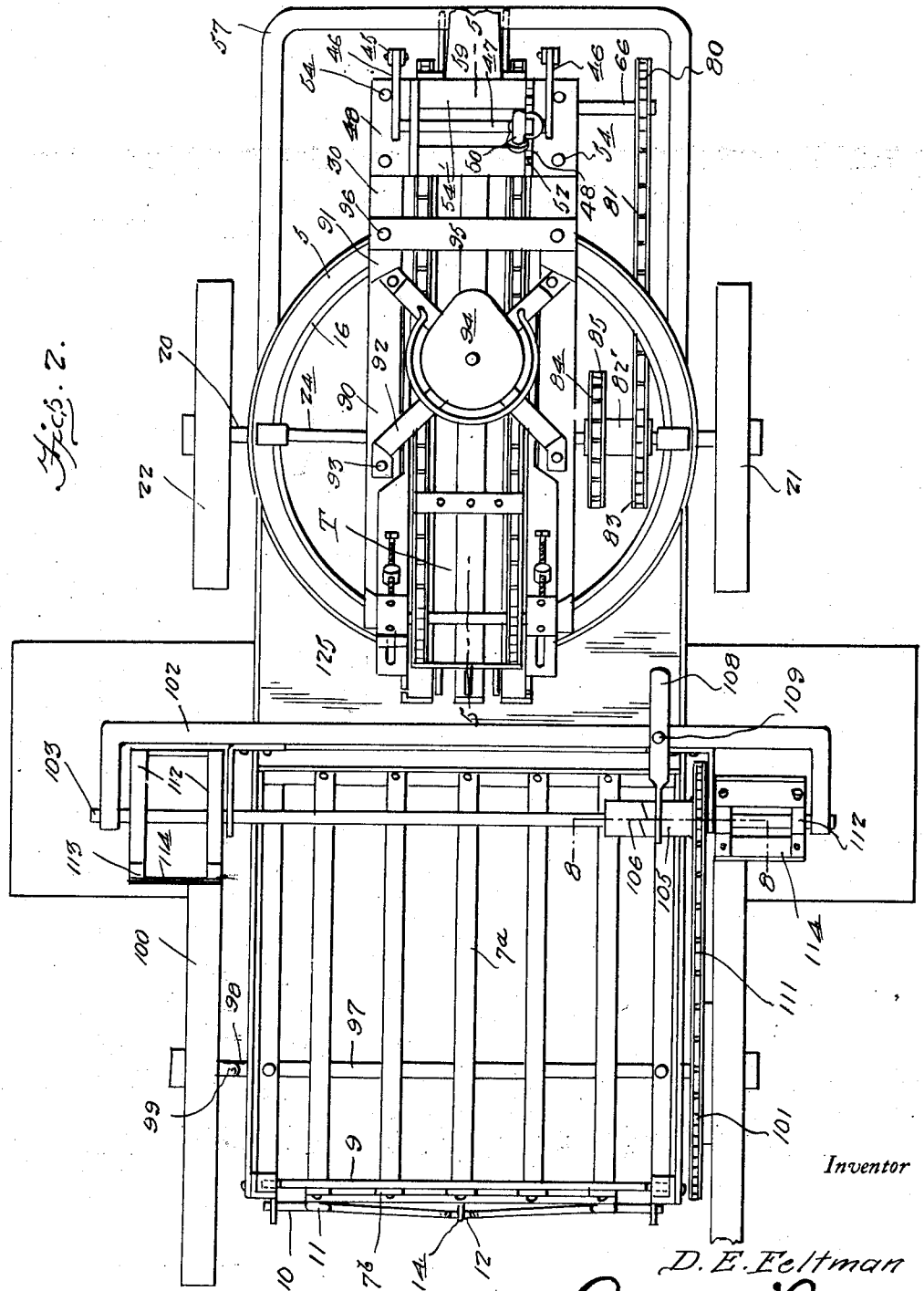
Figure 3:
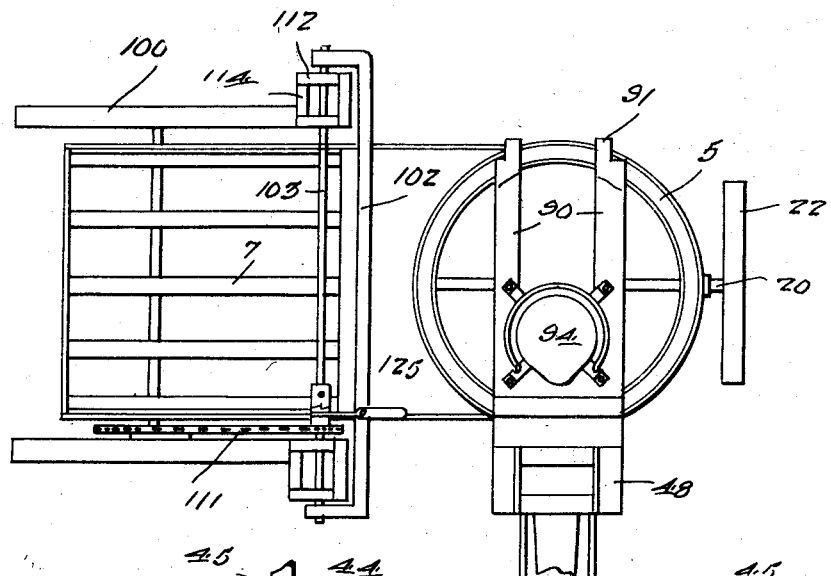
Figure 4:
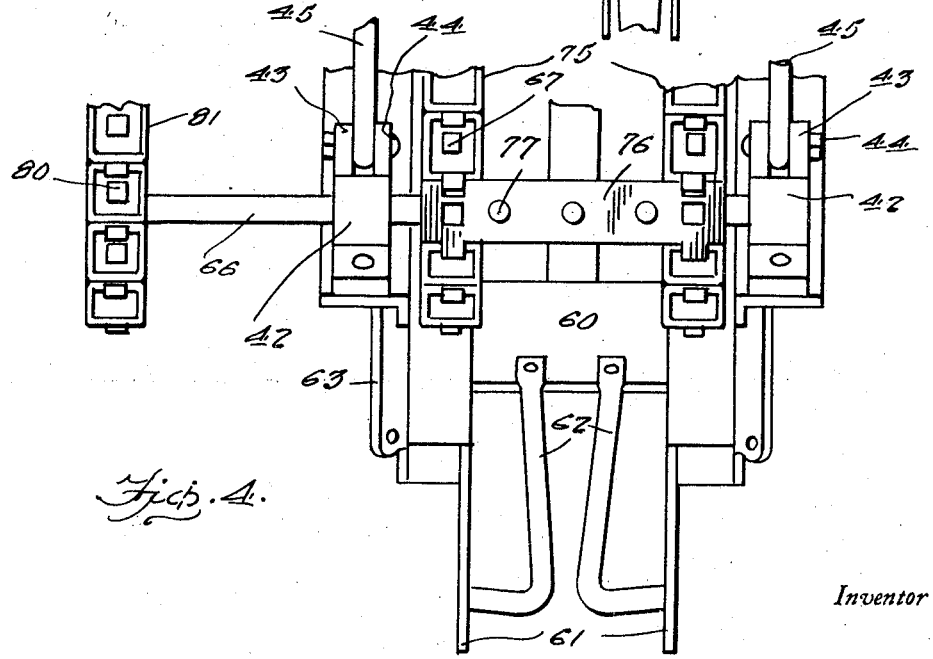

In the drawing:

Figure 1 is a side elevation of the machine embodying the features of my invention, Figure 2 is a top plan view thereof showing the front truck directed straight ahead, Figure 3 is a similar view showing the truck directed for a right turn, Figure 4 is an enlarged detail fragmentary top plan view showing particularly the beet digging means and the front end of the tiltable truck, Figure 5 is a fragmentary detail vertical longitudinal section taken substantially on the line 5—5 of Figure 2, Figure 6 is a top plan view of the trough, Figure 7 is a perspective view of one of the beet toppers, Figure 8 is an enlarged detail section taken substantially on the line 8—8 of Figure 2, and Figure 9 is a detail view of the front axle structure.

Referring to the drawings in detail, it will be seen that letters A denote side frame bars which merge at their front ends into a horizontal ring 5 and at their rear ends into downwardly and rearwardly inclined extensions 6. A slatted receptacle 7 is formed on the extensions 6 having a bottom 7$^a$ slanting with the extensions 6 and having its rear end 7$^b$ swingably mounted at its upper end as at 9 so that the free end is capable of swinging outwardly for dumping any beets therein.

The free end is prevented from swinging outwardly by a shaft 10 having a pair of cranks 11 extending in one direction and a crank 12 extending in the opposite direction, a hook 14 being engageable with the crank 12 to hold the shaft with its cranks 11 extending upwardly to prevent the rearward swinging movement of the lower end of the gate or end 7b.

An angle iron ring 16 is rotatable in the ring 5. A pair of standards 17 are fixed to diametrically opposite points of the ring 16 and depend downwardly therefrom and on their lower ends have bearing segments 18 to which are attached bearing caps 19 to rotatably receive front axle 20. A wheel 21 is fixed for rotation with the axle 20 at the right hand end thereof and a wheel 22 is journaled on the left hand end thereof.

A sprocket wheel 23 is rotatable about a sleeve 24 fixed to the shaft 20 between bearing segments 18 and includes a groove collar 25 and a clutch segment 26. A clutch segment 27 is fixed to the sleeve 24 by a set screw 28. A lever 29 is engaged with the collar 25 so that the sprocket wheel 23 may be shifted on the sleeve 24 to engage its clutch segment 26 with the clutch segment 27 so that the sprocket wheel will rotate with the axle 20 and the right hand wheel 21.

Angle bars 30 are disposed in spaced parallelism and fixed under the ring 16 and connected at their rear ends by a cross angle bar 31. A slatted trough T is rockably mounted between the angle bars 30. This trough T includes a bottom slat 33 to each side of which is an angle bar slat 34 and above the angle bar slat 34 are angle bar slats 35.

These slats 33 and 34 are connected by means of straps 36 and 37 in spaced relation to one another while bars 34 and 35 are held in fixed spaced relation to one another by extensions 36' at the ends of strap 36 and by the extension 38 on strap 37. Portions of the angle bar slats 35 are cut away to provide a recess 39 through which extend angle bars 30.

A shaft 40 is extended through blocks 41 bolted as at 42' on the slats 34 at one end of the slots 39 and the ends of this shaft 40 are rockable in the angle bars 30. Bearings 42 are mounted on the front lower end of the slats 35 of the trough T and each is provided with a pair of spaced ears 43 having a bolt 44 extending therethrough.

Links 45 are engaged with the bolts 44 and extend upwardly and are pivotally engaged with cranks 46 on a shaft 47 which is journaled in brackets 48 on the forward ends of the angle bars 30 and a lever 50 is fixed on the shaft 47 and has a detent structure 51 cooperable with notches 52 on the right hand bracket.

The forward ends of the angle bars 30 are connected together by bars 53 which are fixed between the brackets 48 and the bars 30 by means of bolts 54 or in any other suitable manner. The forward bar 53 is provided with a downwardly extending loop 55 with which chains 56 may be engaged for supporting the forward or bight portion of a U-shaped draw bar 57 the extremities of which are engaged with bearing caps 19 as is clearly indicated in Figure 5.

A tongue 59 is suitably fixed to the front of the wheeled truck which I am now describing in detail. A plate 60 is fixed to the forward ends of slats 33 and 34 and has fixed thereto digging plow blades 61 extending forwardly and downwardly in spaced parallelism to each other. Substantially L-shaped guides 62 have the extremities of their shorter legs fixed to the inner sides of the forward ends of the blades 61 and their longer legs extending rearwardly and diverging rearwardly from each other with their extremities fixed to the plate 60.

Side wings 63 are fixed to the sides of the plate 60 and incline outwardly and upwardly. The bars 35 are provided with slots 64 at their forward ends through which bolts 65 of the bearings 42 extend so that these bearings 42 may be adjusted.

A shaft 66 is journaled through the bearings 42 and has a pair of sprockets 67 fixed thereto within the lower front end of the trough T. The upper rear ends of the slats 35 are slotted as is indicated at 68 to receive bolts 69 of bearings 70 so that these bearings 70 may be adjusted. A shaft 71 is journaled in the bearings 70 and has sprockets 72 thereon. The bearings 70 have associated therewith set screws 73 threaded through lugs 74 rising from the slots 35.

Chains 75 are trained over the sprockets 67 and 72. Cross members 76 are fixed to the chains 75 and have teeth or fingers 77 projecting outwardly from the orbit of movement of the chain so as to move along the bottom of the trough T and upwardly so as to slide beets, potatoes or the like upwardly along the trough after the beets have been dug from the ground by the plows or blades 61 and guided up the guides 62 on to the plate 60 as the machine is travelling forwardly.

A sprocket 80 is mounted on one end of the shaft 66 and has a chain 81 trained thereover. A shaft 82 is mounted between the right hand standard 17 and the right hand bar 30 and has a hub 82' rotatable thereon. Sprockets 83 and 84 are fixed to the hub 82'. The chain 81 is trained over the sprocket 83.

A chain 85 is trained over the sprocket 84 and also over the sprocket 23 so that when clutch segments 27 and 26 are engaged by shifting the sprocket 23 with the lever 29, the endless conveyor formed by chains 75, cross members 76 and fingers 77 will be brought into operation to move beets up the bottom of the trough T. Straps 90 are fixed to the bars 30 within the confines of the ring 16 and have their ends offset as at 91 to extend over rings 5 and 16.

U-shaped brackets 92 have their ends fixed to the straps 90 as at 93 and their bights cross each other so as to support a seat 94. A cross bar 95 is connected to the front offset ends 91 as at 96 to provide a foot rest.

A rear axle 97 is fixed across the rear portions of the extension 6 and has upstanding ends 98 with outwardly directed terminal journals 99 on which are rotatable rear wheels 100. A sprocket 101 is fixed for rotation with the right hand rear wheel 100. A U-shaped bracket 102 is provided with an elongated bight fixed across the bars A at their juncture with their extensions 6 and the relatively short legs of this bracket 102 extend rearwardly and have journaled in their extremities a shaft 103.

A sprocket 104 has a clutch segment hub 105 rotatable on the shaft 103 and a clutch segment 106 is fixed to the shaft 103 by a set screw 107. A lever 108 is rockable as at 109 on the bracket bar 102 and is engaged with the hub 105 by having its end bifurcated as is indicated at 109' to engage in a groove 110 formed in the hub 105 so that the clutch segment hub 105 may be shifted into engagement with the clutch segment 106 to cause the sprocket 104 to rotate with the shaft 103.

A chain 111 is trained over the sprocket 101 and 104 so that the shaft 103 will rotate with the right hand rear wheel 100 when the clutch is engaged. A pair of beet toppers are mounted on the end portions of the shaft 103, one adjacent each end thereof. Each beet topper includes a pair of arms 112, the centers of which are fixed on the shaft 103.

The ends of these arms 112 are offset obliquely to provide lips 113 to which are secured cross blades 114 so that a beet may be rested on the bight of the bracket 102 so that the top of the beet will be severed therefrom as one of the blades 114 engages therewith.

Hangers 115 are engaged with the bars A and support platforms 116 so that men may stand on these platforms to receive the beets from the upper end of the trough and bring them into engagement with the beet toppers to sever the tops therefrom and then the beets may be thrown into the slatted receptacle 7. When a desired number of the beets have been gathered in the slatted receptacle, obviously they may be dumped therefrom by releasing the hook 14 so that the bottom end of the door 7b may swing outwardly or rearwardly.

Any suitable means may be used for pulling this machine along a row of beets. As the machine progresses along, the trough having been adjusted through manipulation of the lever 50 to place the plows 60 at the desired depth in the ground, the beets will be caused to move up the guides 61 and conveyed up the trough T and men standing on the platform 116 will cause the topping of the beets by the beet toppers and throw the beets in the receptacle, from which they may be dumped at desired intervals.

Particular attention is directed to the fact that the machine may be turned around in practically its length either to the right or to the left because of the manner in which the front truck is mounted by the rings 5 and 16 as heretofore described in detail.

By changing the plows 61 to a scoop a machine may be changed from a beet gatherer to a potato harvester and a platform 125 is mounted between the ring structure and the forward end of the receptacle and may be inclined toward the receptacle so that potatoes will roll from the upper end of the trough into the receptacle. In a beet harvester, however, it is preferable to have the platform 125 horizontal as is clearly indicated in Figure 5 so that any beets fallen thereon will stay there so that the men standing on the platform may pick up the beets therefrom and bring them into engagement with the topping mechanism.

When it is not desired to use the gathering mechanism and the topping mechanism these may be thrown out of operation by letting out the clutches 26 and 105 respectively.

It is thought that the construction, operation, utility and advantages of this invention will now be quite apparent to those skilled in this art without a more detail description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A beet harvesting machine comprising a pair of side frame bars having intermediate horizontal portions merging at their rear ends in downwardly and rearwardly inclined extensions and at their forward ends in a horizontal ring, a receptacle between the extensions, an axle bar across the extensions merging at its end in uprights terminating in outwardly directed journals, wheels on the journals, a ring rotatable in the first mentioned ring, standards depending from diametrically opposite points of the second mentioned ring, an axle on the lower ends of the standards, a frame fixed to the second mentioned ring and projecting beyond the rings, a trough rockably mounted in the frame, digging means at one end of the trough, conveyor means in the trough, means for tilting the trough, wheels on the axle, and means operatively connecting one of the second mentioned wheels with the conveyor means.

2. A beet harvesting machine comprising a main frame including a ring at the forward end thereof, a wheel support for the rear end of the frame, a ring rotatable in the first mentioned ring, standards depending diametrically from opposite points of the second mentioned ring, an axle on the lower ends of the standards, an auxiliary frame fixed to the second mentioned ring and projecting beyond the rings, a trough rockably mounted in the auxiliary frame, beet digging means at one end of the trough, conveyor means in the trough, means for tilting the trough, wheels on the axle, and means operatively connecting one of the wheels with the conveyor means.

3. A beet harvesting machine comprising a main frame, wheel support for the rear end of said main frame, a ring at the front end of said main frame, a ring rotatable in the first mentioned ring, standards depending from diametrically opposite points of the second mentioned ring, an axle on the lower ends of the standards, wheels on the axle, an auxiliary frame fixed to the second mentioned ring, a trough rockably mounted in the auxiliary frame, plows projecting from the forward end of the trough, guides leading inwardly and rearwardly from the plows, means for tilting the trough, conveyor means in the trough and driving means operatively associated with the conveyor means and one of said wheels.

4. A beet harvesting machine comprising a main frame, wheel support for the rear end of said main frame, a ring at the front end of said main frame, a ring rotatable in the first mentioned ring, standards depending from diametrically opposite points of the second mentioned ring, an axle on the lower ends of the standards, wheels on the axle, an auxiliary frame fixed to the second mentioned ring, a trough rockably mounted in the auxiliary frame, plows projecting from the forward end of the trough, guides leading inwardly and rearwardly from the plows, means for tilting the trough, and conveyor means in the trough, said conveyor means comprising a pair of shafts journaled across the rear and front ends of the trough, sprockets on the shafts, chains trained over the sprockets, cross members between the chains, teeth on the cross members, means operatively connecting one of the shafts with one of the wheels for driving said conveyor means.

5. In a beet harvesting machine of the class described, a main frame, wheel means supporting the rear end of the main frame, a ring in the front of the main frame, a ring rotatable in the first mentioned ring, a pair of bars fixed to the second mentioned ring in spaced coextensive parallelism, a trough, a shaft across the bottom of an intermediate portion of the trough and journaled in said bars, means for tilting the trough and holding the same in different tilted positions, an endless conveyor in the trough, a chain and sprocket mechanism for operating the endless conveyor, standards depending from the bars, an axle on the lower end of the standards, wheels on said axle, and means operatively connecting one of the wheels with said chain and sprocket mechanism.

In testimony whereof I affix my signature.

DAVID E. FELTMAN.